(12) United States Patent
Nagai et al.

(10) Patent No.: US 7,162,853 B2
(45) Date of Patent: Jan. 16, 2007

(54) LAWN MOWER HAVING HST

(75) Inventors: Hiroki Nagai, Izumiotsu (JP); Hiroyuki Ogasawara, Kawachinagano (JP); Kazuaki Kurohara, Sakai (JP); Katsuhiko Uemura, Sakai (JP); Hiroyuki Tada, Sakai (JP)

(73) Assignee: Kubota Corporation, Osaka (JP)

( * ) Notice: Subject to any disclaimer, the term of this patent is extended or adjusted under 35 U.S.C. 154(b) by 326 days.

(21) Appl. No.: 10/934,318

(22) Filed: Sep. 3, 2004

(65) Prior Publication Data
US 2005/0229568 A1 Oct. 20, 2005

(30) Foreign Application Priority Data
Mar. 31, 2004 (JP) .............................. 2004-104105

(51) Int. Cl.
A01D 69/00 (2006.01)
(52) U.S. Cl. ......................................... 56/10.8; 56/11.9
(58) Field of Classification Search ................. 56/10.8, 56/10.9, 11.1, 11.9; 180/53.4, 337, 344; 475/23, 24, 72, 83
See application file for complete search history.

(56) References Cited

U.S. PATENT DOCUMENTS

| 4,613,024 | A | * | 9/1986 | Irikura et al. ............. 192/18 A |
| 5,544,547 | A | * | 8/1996 | Ishimaru ................... 74/730.1 |
| 6,758,301 | B1 | * | 7/2004 | Shiba et al. ................ 180/383 |
| 6,918,850 | B1 | * | 7/2005 | Hasegawa et al. ............ 475/72 |
| 6,932,179 | B1 | * | 8/2005 | Sakikawa et al. ........... 180/242 |

2003/0106296 A1 6/2003 Ishimori

FOREIGN PATENT DOCUMENTS

| FR | 2 722 856 A | 1/1996 |
| FR | 2 843 719 A | 2/2004 |
| JP | 2003-106412 | 4/2003 |
| JP | 2003106412 | 9/2003 |

* cited by examiner

*Primary Examiner*—Meredith C. Petravick
*Assistant Examiner*—Alicia Torres
(74) *Attorney, Agent, or Firm*—The Webb Law Firm

(57) ABSTRACT

A lawn mower has driving front wheels and driving rear wheels. The mower includes a mower unit mounted between the front wheels and the rear wheels to be vertically movable, an engine mounted to a front portion of a vehicle body, a transmission case disposed rearwardly of the engine, an HST coupled to a rear wall of the transmission case, the HST having a pump shaft and a motor shaft both projecting forwardly, a charge pump for the HST attached to a front wall of the transmission case, a transmission mechanism disposed inside the transmission case. The transmission mechanism includes an input shaft operably coupling a transmission shaft from the engine to the pump shaft, a first output shaft for transmitting power from the motor shaft to a transmission shaft for the front wheels, a PTO shaft for transmitting power from the input shaft to a transmission shaft for the mower unit, and a second output shaft for transmitting power from the input shaft to the charge pump. The first and second output shafts extend in a fore-and-aft direction of the mower and parallel with the input shaft, the second output shaft being disposed upwardly of the input shaft, the first output shaft being disposed downwardly of the input shaft.

6 Claims, 13 Drawing Sheets

LAWN MOWER HAVING HST

RELATED APPLICATION

Applicant hereby claims priority to Japanese Patent Application No. 2004-104105, filed on Mar. 31, 2004.

BACKGROUND OF THE INVENTION

1. Field of the Invention

This invention relates to a lawn mower having driving front wheels and driving rear wheels, the mower comprising a mower unit mounted between the front wheels and the rear wheels to be vertically movable, an engine mounted to a front portion of a vehicle body, a transmission case disposed rearwardly of the engine, and an HST coupled to a rear wall of the transmission case.

2. Description of the Related Art

A mid-mount, riding lawn mower having a mower unit mounted between front wheels and rear wheels is known from e.g. Japanese Patent Application "Kokai" No. 2003-106412. In this, an engine and right and left front wheels are arranged on a front portion of the vehicle body and a transmission case having rear wheels on the right and left sides thereof is arranged on a rear portion of the vehicle body. Power from the engine is shaft-transmitted to the HST coupled to a front face of the transmission case 6. Then, speed-changed power available from this HST is divided inside the transmission case into one power portion to be transmitted to the rear wheels and the other power portion which is is shaft-transmitted to the front wheels 2. Further, the mower unit is mounted between the front wheels 2 and the rear wheels 3 to be vertically movable. In the case of such riding lawn mower, a front-wheel driving shaft for transmitting the power from the transmission case to the front portion of the vehicle body is disposed at a high position not to interfere with an upward movement of a mower implement 1. In doing so, since the HST is coupled to the front face of the transmission case, it is necessary to either cause the front-wheel driving shaft to extend through the HST or to arrange the HST at a position laterally retracted away therefrom. However, in the former case, for such insertion of the front-wheel driving shaft through the HST, it is needed to increase the physical size of this HST to allow accommodation of the change speed mechanism therein. In the latter case, for such arrangement of the front-wheel driving shaft laterally away from the HST, it is needed to increase the lateral width of the transmission case.

In an attempt to overcome the above-described problem, a lawn mower is known from U.S. 2003/0106296A1, in which the HST is mounted to a rear wall of the transmission case. Regarding this lawn mower, however, the above cited document lacks any disclosure respecting arrangements of a charge pump and a power transmission shaft for the charge pump required for the HST. In the absence of contemplations respecting such arrangements of charge pump and power transmission shaft, it is not possible to achieve sufficient compactness in the powertrain consisting of the transmission case and the HST employed in the mid-mount riding lawn mower.

SUMMARY OF THE INVENTION

In view of the above, a primary object of the present invention is to provide a lawn mower having a compact powertrain comprising an HST having a charge pump and a transmission case although a front-wheel driving shaft is arranged at a highest position possible.

For accomplishing the above object, there is provided a lawn mower comprising driving front wheels and driving rear wheels, a mower unit mounted between the front wheels and the rear wheels to be vertically movable, an engine mounted to a front portion of a vehicle body, a transmission case disposed rearwardly of the engine, an HST coupled to a rear wall of the transmission case, the HST having a pump shaft and a motor shaft both projecting forwardly, and a transmission mechanism disposed inside the transmission case. The transmission mechanism includes an input shaft operably coupling a transmission shaft from the engine to the pump shaft, a first output shaft for transmitting power from the motor shaft to a transmission shaft for the front wheels, and a PTO shaft for transmitting power from the input shaft to a transmission shaft for the mower unit. In this lawn mower, according to the characterizing feature of the present invention, the transmission mechanism further includes a second output shaft for transmitting power from the input shaft to the charge pump, and the first and second output shafts extend in a fore-and-aft direction of the mower and parallel with the input shaft, the second output shaft being disposed upwardly of the input shaft, the first output shaft being disposed downwardly of the input shaft.

According to the above-described construction, the charge pump for the HST and the second output shaft for transmitting power to this charge pump can be disposed in a space available upwardly of the input shaft and a space free from any projecting obstacles can be provided forwardly and downwardly of the transmission case. Also, the powertrain consisting essentially of the transmission case and the HST can be formed compact.

According to one preferred embodiment of the invention, said rear wall of the transmission case is constructed as a port block for the HST. This construction allows for even more compactness of the powertrain.

Preferably, a traveling brake acting on the motor shaft is mounted to a rear portion of the HST. This achieves greater freedom in the design of the powertrain as well as greater ease in the maintenance/repair thereof. Still preferably, a cooling fan is mounted also to the rear portion of the HST, the cooling fan being driven by the pump shaft for cooling both the HST and the traveling brake. This construction is advantageous in that both the HST and the brake can be cooled by the single cooling fan.

Further and other features and advantages of the present invention will become apparent upon reading the following detailed disclosure of the preferred embodiments thereof with reference to the accompanying drawings.

DESCRIPTION OF THE PREFERRED EMBODIMENTS

Figure 1:
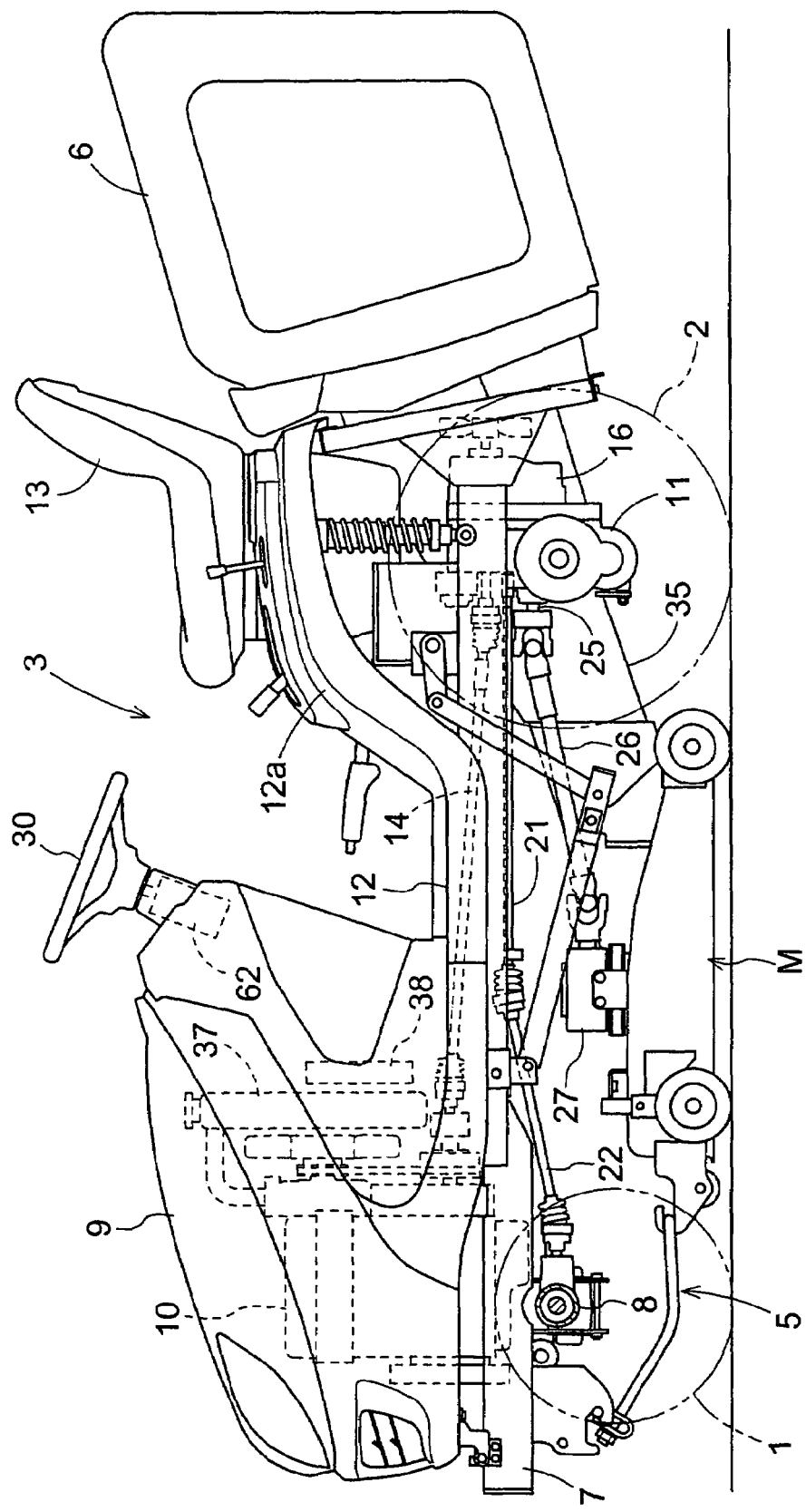
FIG. 1 is an overall side view of a riding lawn mower.

FIG. 1 shows an overall side view of a riding lawn mower relating to the present invention. This riding lawn mower includes an operator riding traveling vehicle body 3 of four-wheel drive type having steerable driving front wheels 1 and non-steerable driving rear wheels 2. Downwardly of this vehicle body 3, there is suspended a mower unit M to be vertically movable via a quadruple link mechanism 5 which is driven up/down by a hydraulic cylinder 4. Further, to the rear portion of the vehicle body, there is connected a grass collecting container 6 for collecting grass cut by the mower unit M.

The vehicle body 3 mounts a pair of right and left main frames 7. To the front portions of these frames 7, there is pivotally mounted (i.e. mounted to be capable of a "rolling action") a front axle case 8, to the right and left of which the front wheels 1 are attached to be steerable. There is also mounted an engine 10 covered with a hood 9. To the rear of the main frames 7, there is connected and secured a transmission case 11 with the rear wheels 2 attached to the right and left sides thereof. A pair of steps 12 are mounted and connected to the tops of the respective main frames 7 and a driver's seat 13 is mounted between right and left fenders 12a extending continuously from the rear portions of the respective steps 12.

Figure 3:
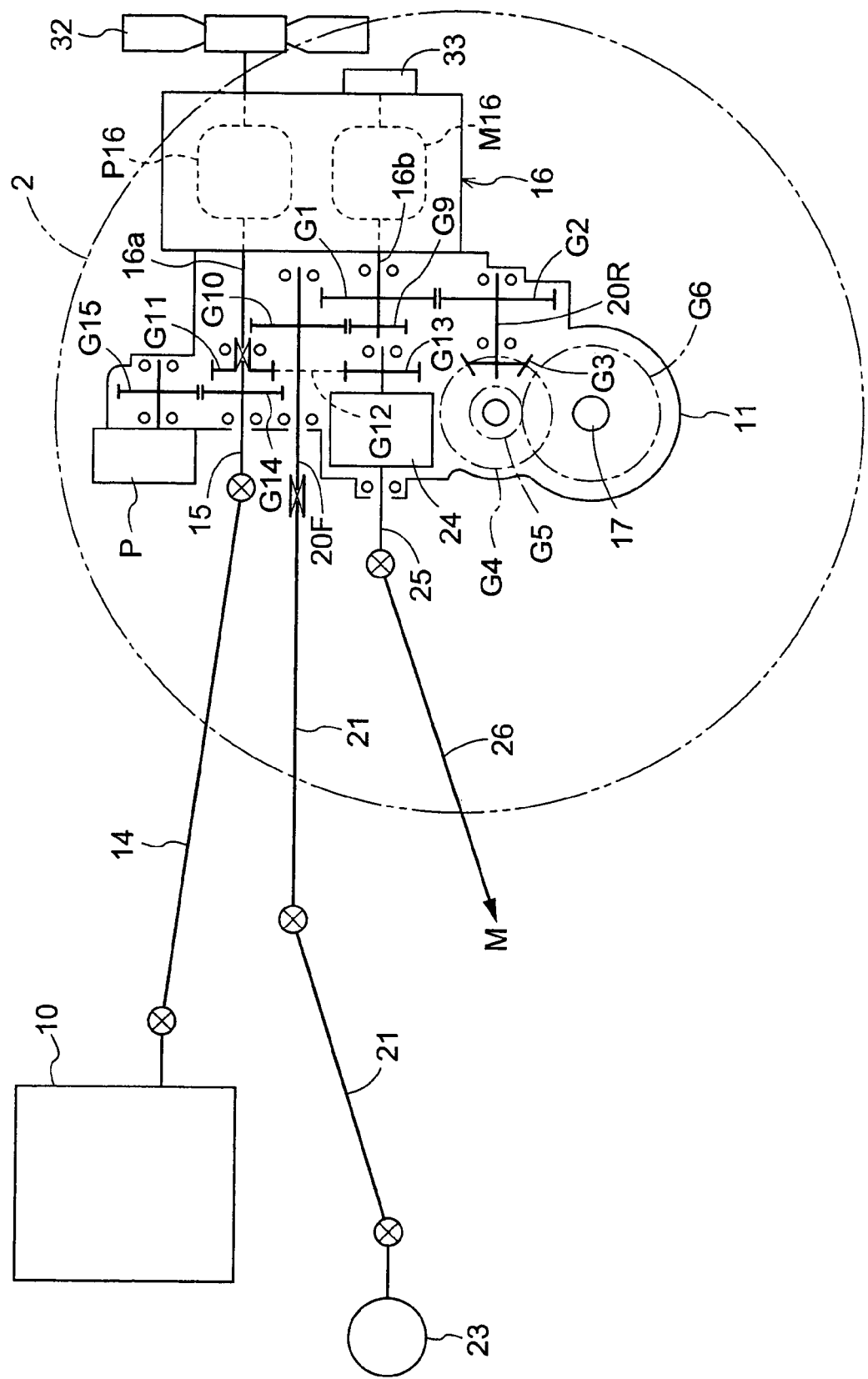
FIG. 3 is a diagram showing a transmission system.

As shown in the diagram of FIG. 3 showing the transmission system, rotational power outputted from the engine 10 along a fore-and-aft axis is transmitted via a transmission shaft 14 to a front portion of an input shaft 15 of the transmission case 11. In this case 11, the power is divided between a power for vehicle traveling transmission and a power for PTO transmission for implement. Inside this transmission case 11, there is mounted a gear transmission mechanism including various gear pairs to be detailed below.

As shown in FIGS. 3 through 6, the input shaft 15 is connected end-to-end to an input pump shaft 16a of an HST (hydrostatic transmission) 16 capable of being switched over between a forward drive and a reverse drive, the HST 16 being connected to a rear face of the transmission case 11. The power inputted to this HST 16 is speed-changed in stepless manner for forward or reverse drive and then outputted from an output motor shaft 16b, from which the power is outputted, via an output gear G1 and a gear G2, to a rear wheel drive shaft 20R acting as a third output shaft. Further, this power is converted via bevel gears G3, G4 and further gears G5, G6 into a rotational power about a laterally oriented axis to a laterally longitudinal transmission shaft 17. Thereafter, from this laterally longitudinal transmission shaft 17, the power is transmitted via right and left side clutches 18 and reduction gears G7, G8 to right and left axles 19, respectively. The rear wheel drive shaft 20R and the motor shaft 16b extend both forwardly and extend also parallel with each other.

Further, the speed-changed power from the output motor shaft 16b of the HST 16 is transmitted via an output gear G9 and a gear G10 to a front wheel drive shaft 20F acting as a first output shaft and the power taken from this front wheel drive shaft 20F forwardly of the case is transmitted via transmission shafts 21, 22 extending forwardly and arranged along the underside of the vehicle body to a differential mechanism 23 housed within the front axle case 8, whereby the front wheels 1 are driven at a speed synchronized with the rear wheels 2. In this, the front wheel drive shaft 20F is arranged within the vertical width of the HST 16 in its side view. The front wheel drive shaft 20F extends parallel with the motor shaft 16b and is disposed at a position higher than this motor shaft 16b. Whereas, the rear wheel drive shaft 20R is disposed at a position lower than the motor shaft 16b.

Also, a portion of the power transmitted to the input shaft 15 is taken off via a gear G11 as a power for the implement drive system. This power is transmitted via gears G12, G13 to a PTO clutch 24, after which the power is taken from a PTO shaft 25 projecting forwardly from the front face of the case 11 and then is transmitted via a transmission shaft 26 to an input case 27 (see FIG. 1) mounted and connected to an upper deck surface of the mower unit M. In the above, as shown in FIG. 3, the gear G11 adapted for taking off the implement driving power from the input shaft 15 functions also as a shaft coupling for coupling the input shaft 15 with the input pump shaft 16a.

The HST 16 comprises a connected assembly consisting of a casing 16c and a thick-plate, block-like port block 16d connected to the front face of the casing 16c. The casing 16c includes an axial plunger type variable displacement pump P16 driven by the input pump shaft 16a and an axial plunger type fixed displacement motor M16 for driving the output motor shaft 16b, with the pump P16 and the motor M16 being assembled with one above the other. Further, the input motor shaft 16a which is constantly driven extends rearward through and beyond the casing 16c and a cooling fan 32 is attached to a rearward projecting end of this input motor shaft 16a. Further, there is provided a traveling brake 33 which acts on a rear end of the output motor shaft 16b. This brake 33 is link-coupled to a brake pedal 28 disposed adjacent a right foot position of the driver's section. With this arrangement, the cooling fan 32 is capable of cooling not only the HST 16, but also the traveling brake 33.

Figure 2:
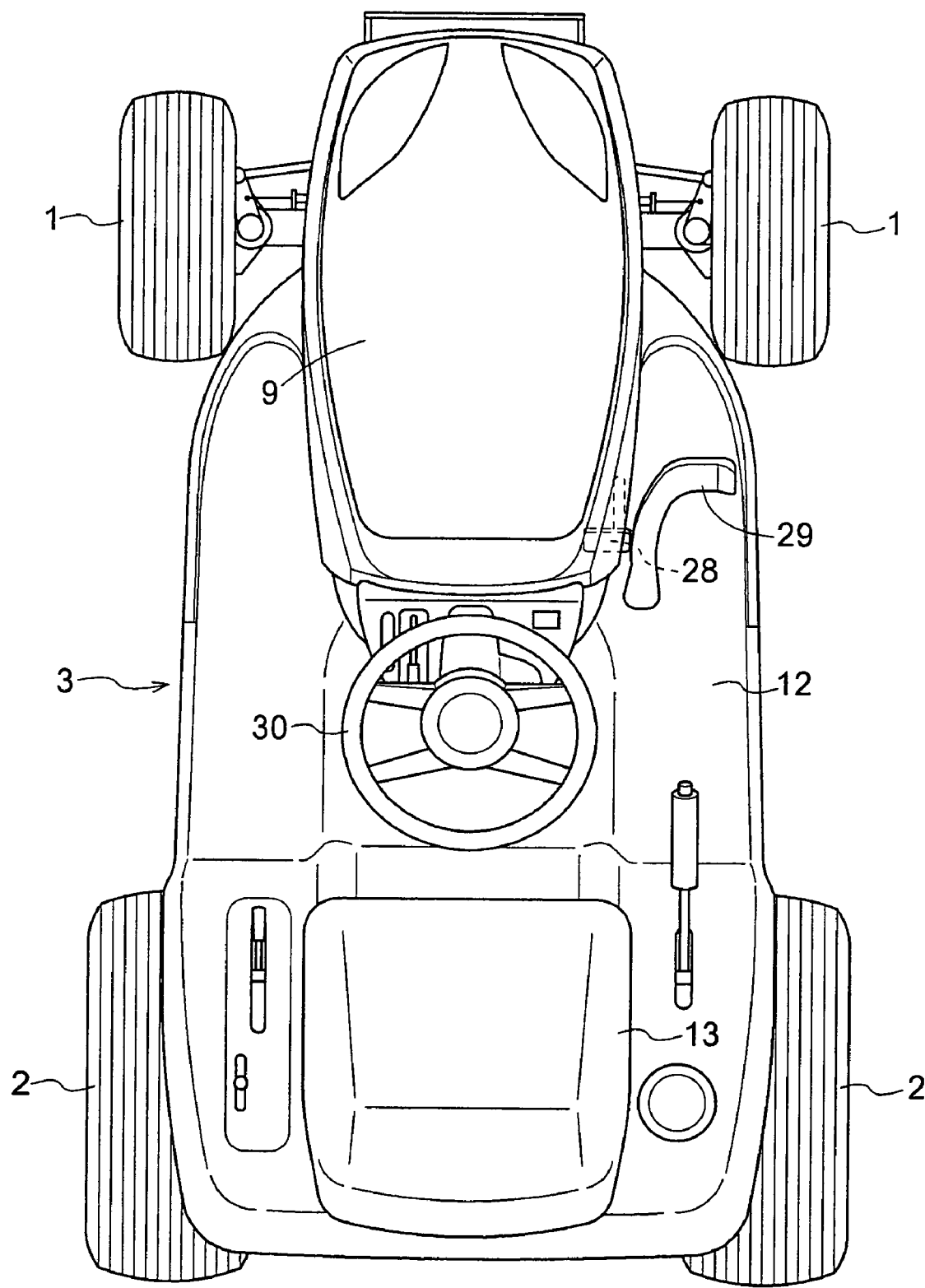
FIG. 2 is an overall plan view showing the riding lawn mower.

To the left side face of the casing 16c, there is mounted a speed changer shaft (trunnion shaft) 34 operable for varying a swash plate angle of the variable displacement pump P16 thereby to desirably change the rotational speed and direction of the output motor shaft 16b. This speed changer shaft 34 is link-coupled to a speed changer pedal 29 (see FIG. 2) disposed adjacent the right foot position of the driver's section. In operation, acceleration in the forward direction is provided by an operator's forwardly stepping on this speed changer pedal 29. Acceleration in the reverse direction is provided by the operator's rearwardly stepping on the pedal 29. Upon release of the stepping force in either direction, the speed changer peal 29 is automatically returned to its neutral position.

The transmission case 11 is constructed as an aluminum die-cast case and includes a main case portion 11a, a left (speed) reduction case portion 11b and a laterally longitudinal case portion 11c which extend continuously from the lower side of the main case portion 11a, and a right (speed) reduction case portion 11d extending continuously from the right end of the laterally longitudinal case portion 11c. Further, the entire transmission case 11 is divided into separate front and rear case sections 11F, 11R which are bolt-connected along the entire peripheries thereof. The HST 16 is connected to the rear face of the main case portion 11a. And, the laterally longitudinal transmission shaft 17 is inserted through the laterally longitudinal case portion 11c. The right reduction case portion 11d mounts the right axle 19 and the left reduction case portion 11b mounts the left axle 19, respectively.

Figure 4:
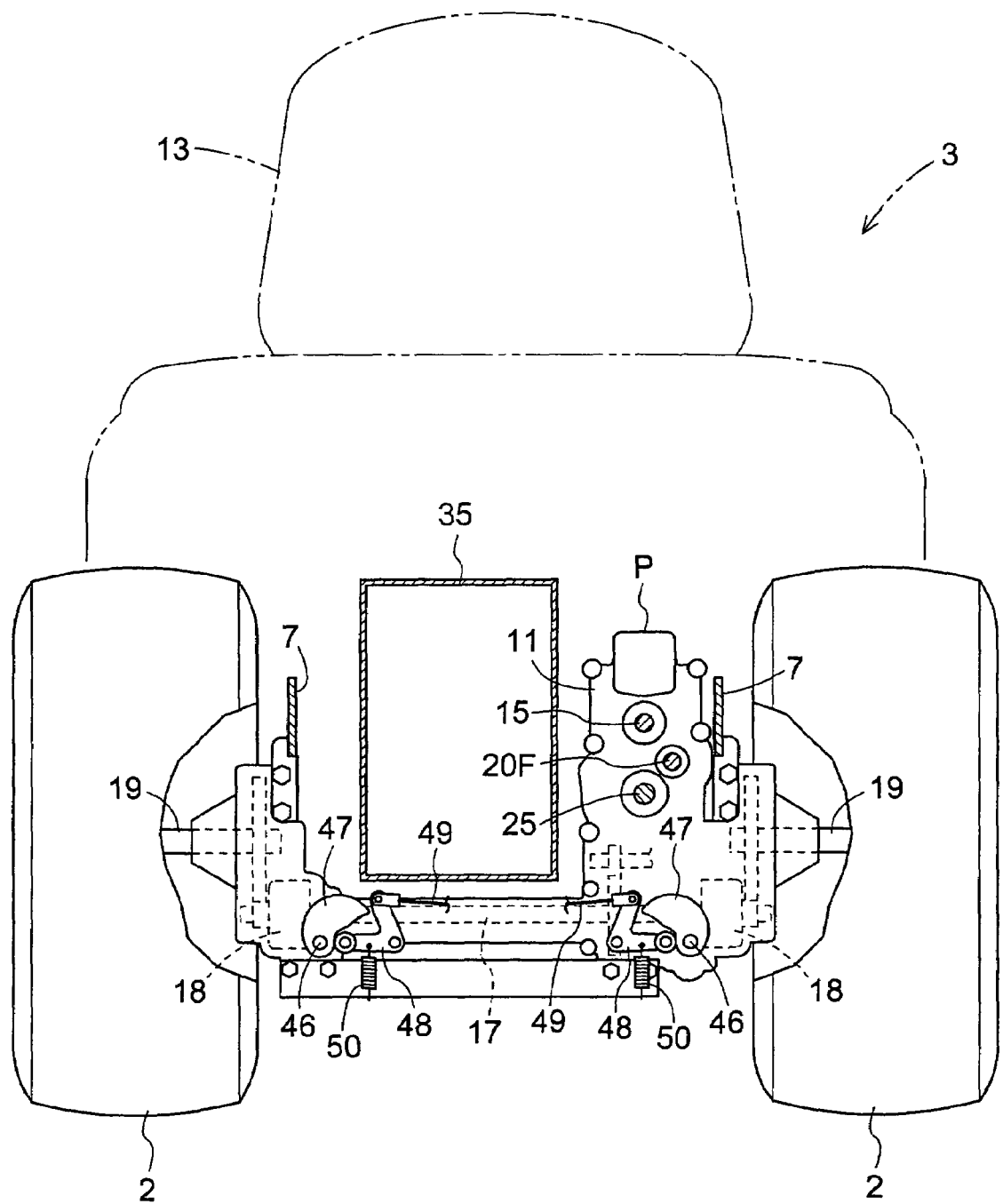
FIG. 4 is a front view of a transmission case.

Incidentally, as shown in the front view of FIG. 4, the main case portion 11a of the transmission case 11 is disposed with a left-side offset (to the right side in FIG. 4) relative to the traveling vehicle body 3. And, within a free space made available by this offset arrangement under the vehicle body, there is disposed a duct 35 for guiding the grass discharged from the mower 5 to the grass collecting container 6.

Figure 5:
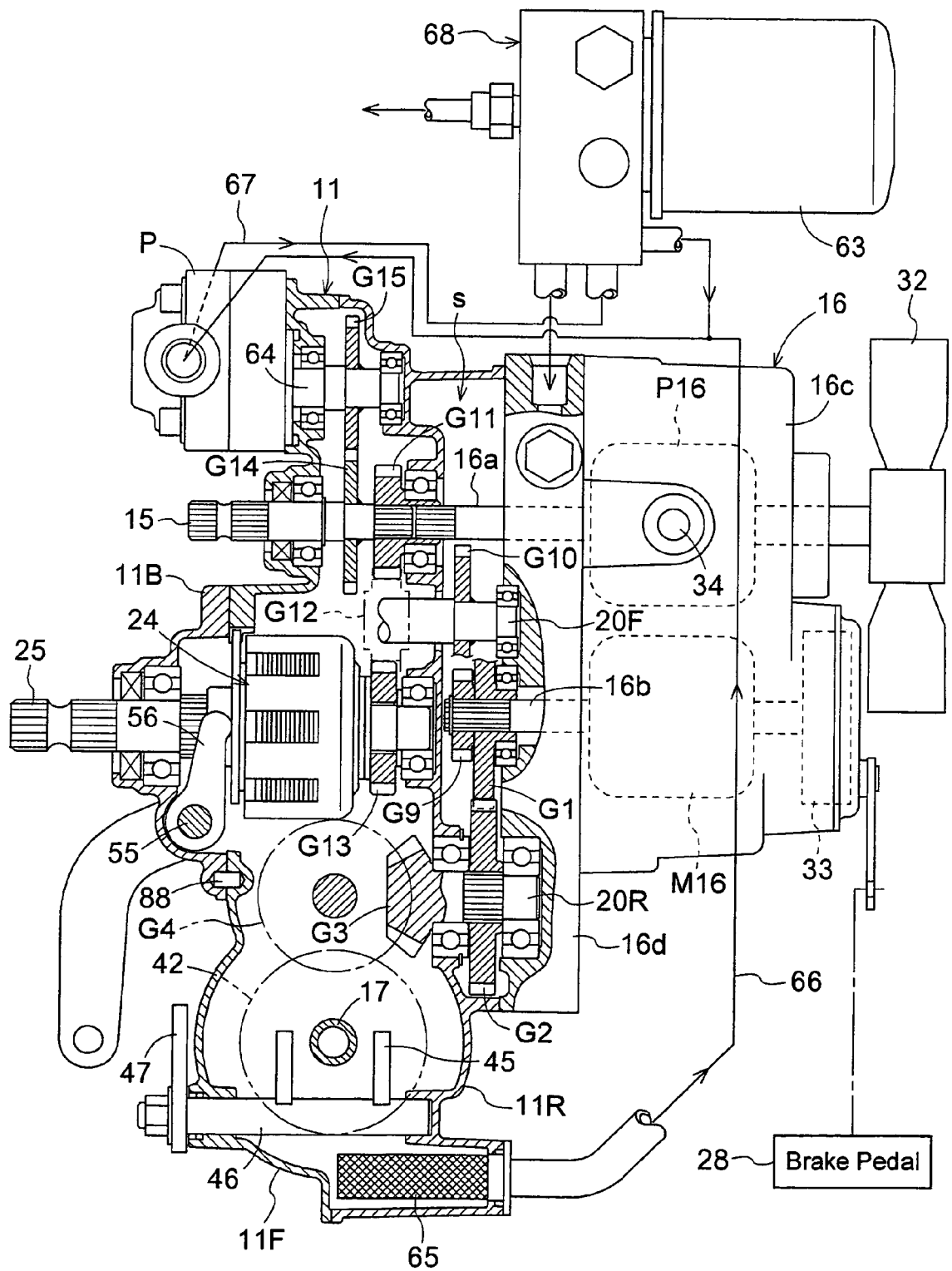
FIG. 5 is a partially cutaway side view of a transmission unit.
Figure 7:
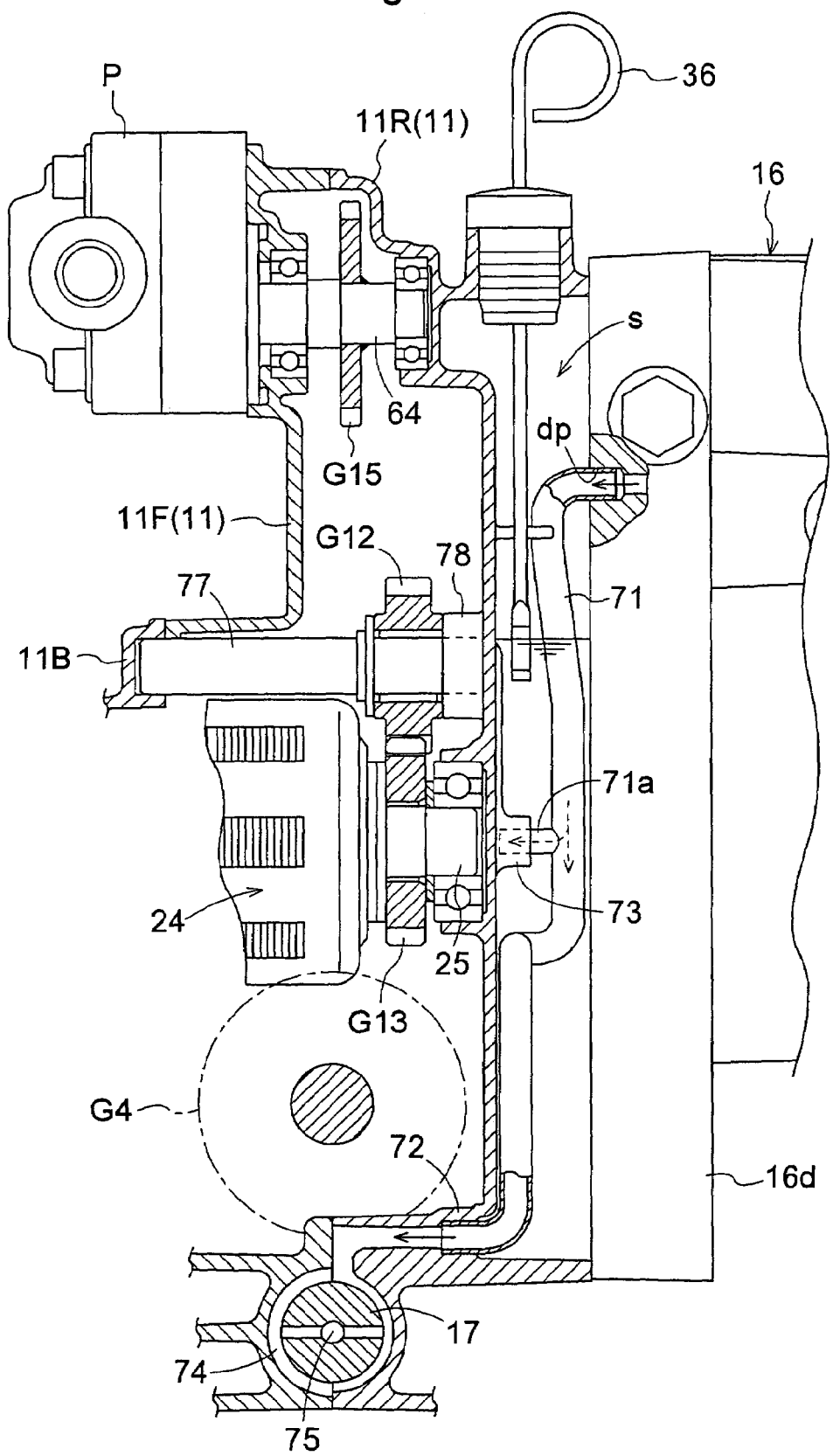
FIG. 7 is a side view in vertical section showing principal portions of the transmission case.

As shown in FIGS. 5 and 7, the rear face of the main case portion 11a of the transmission case 11 is recessed forwardly, except for its peripheral portion which is bonded and connected to the front face of a port block 16d of the HST 16, so that there is formed a narrow space (s) in the fore and aft direction between the rear face of the main case portion 11a and the front face of the port block 16d. Then, within this space (s), there are accommodated the rear wheel driving output gear G1 and the front wheel driving output gear G9 mounted on the output motor shaft 16b of the HST 16, the gear G2 meshing with the output gear G1 and the gear G10 meshing with the output gear G9. Further, an oil check gauge 36 for monitoring the level of lubricant oil in this space (s) is inserted and attached to the upper face of the case.

Figure 6:
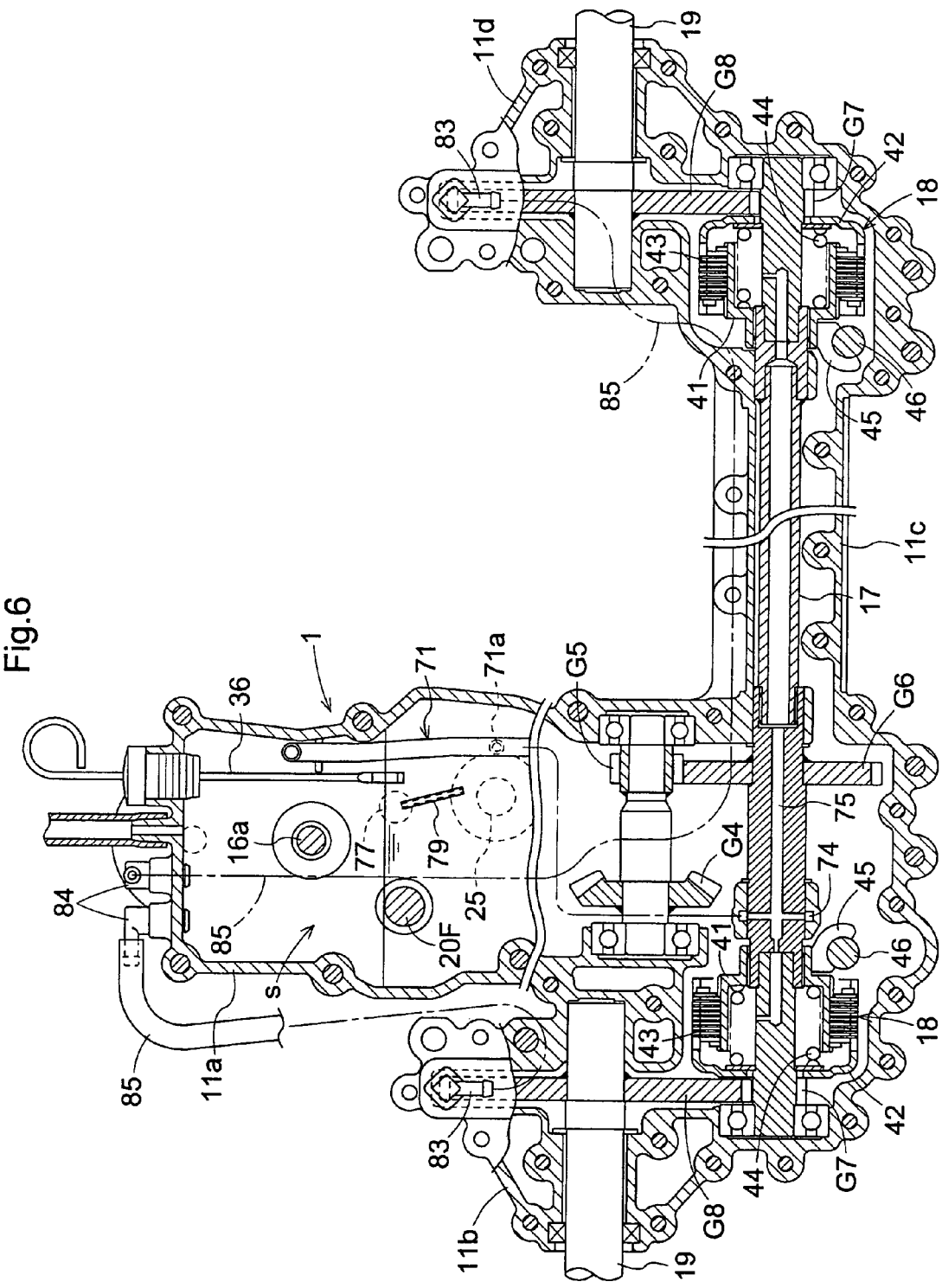
FIG. 6 is a rear view in vertical section of the transmission case.

As shown in FIG. 6, each side clutch 18 is configured as a multiple disc sclutch including such components as a clutch boss 41 shiftably splined on the laterally longitudinal transmission shaft 17, a clutch drum 42 formed integral with the gear G7 loosely mounted on the laterally longitudinal transmission shaft 17, a plurality of clutch discs 43 engaged respectively with the clutch boss 41 and the clutch drum 42 and stacked alternately with each other, and a spring 44 for slidably urging the clutch boss 41 for pressing the clutch disc 43 together.

In operation of this side clutch 18, normally, the clutch boss 41 is shifted by the spring 44 to press the clutch discs 43 against each other, so that the clutch is maintained under a clutch engaged condition for transmitting the power from the clutch boss 41 to the clutch drum 42. On the other hand, when a shift fork 45 pivotally mounted to the transmission case 11 is pivoted to retract the clutch boss 41 against the urging force of the spring 44, the mutually pressed condition of the clutch discs 43 is released, whereby this is realized a clutch disengaged condition for blocking the power transmission from the clutch boss 41 to the clutch drum 42.

Figure 11:
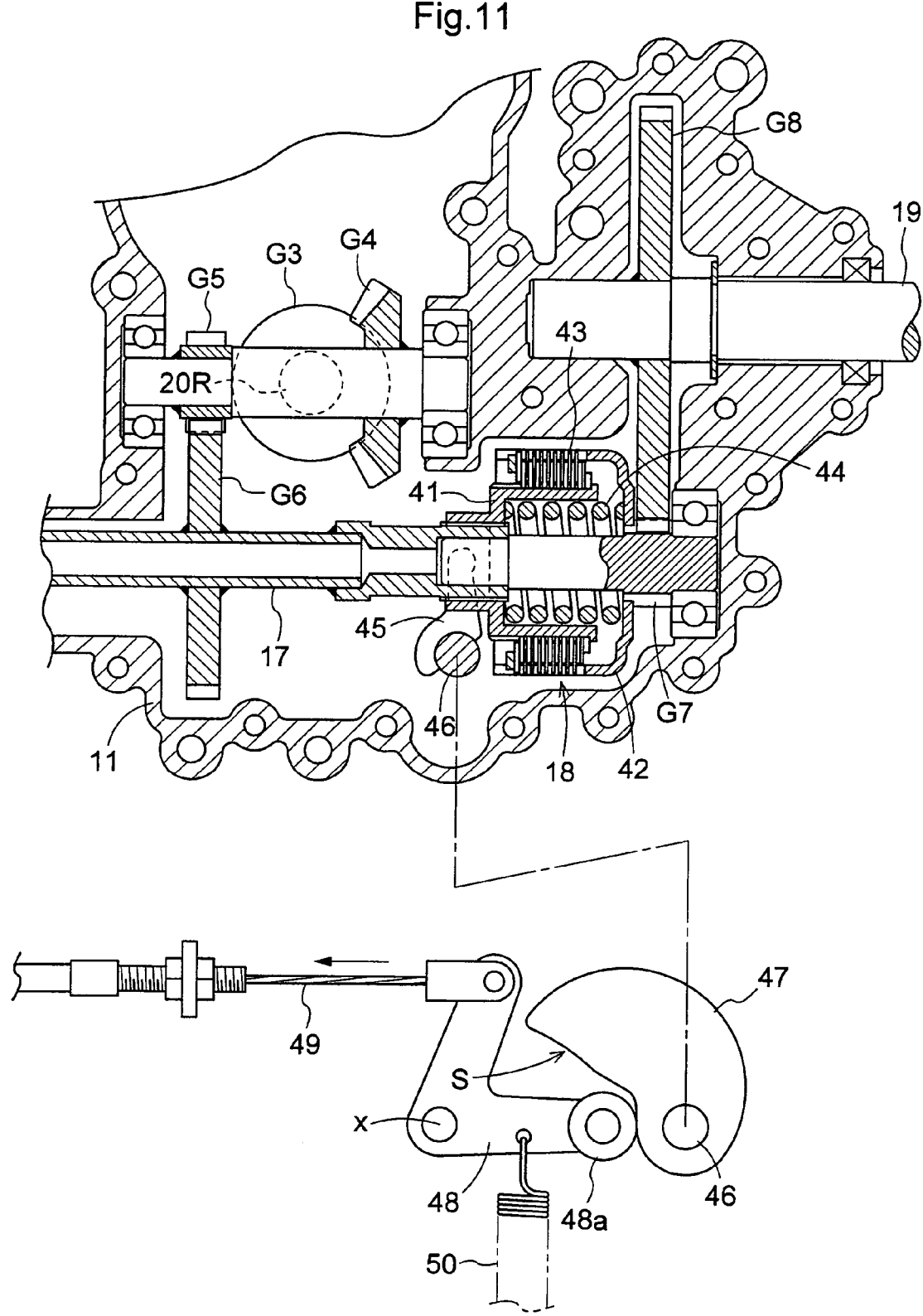
FIG. 11 is a front view showing a side clutch and its operational construction.

As shown in FIGS. 4 and 11, an operational shaft 46 for the shift fork 45 projects from the front face of the transmission case 11 and a cam plate 47 is connected to a projecting end of this operational shaft 46, so that this cam plate 47 is operable by being contacted by an operational arm 48 attached to the front face of the transmission case 11 to be pivotable about a pivot (x) oriented in the fore and aft direction. More particularly, when a release wire 49 connected to the operational arm 48 is pulled to pivot the operational arm 49 against an urging force of a return spring 50, an end roller 48a of the operational arm 48 presses a cam surface S formed along the outer periphery of the cam plate 47, whereby the operational arm 48 is pivoted and eventually the side clutch 18 is disengaged.

Figure 12:
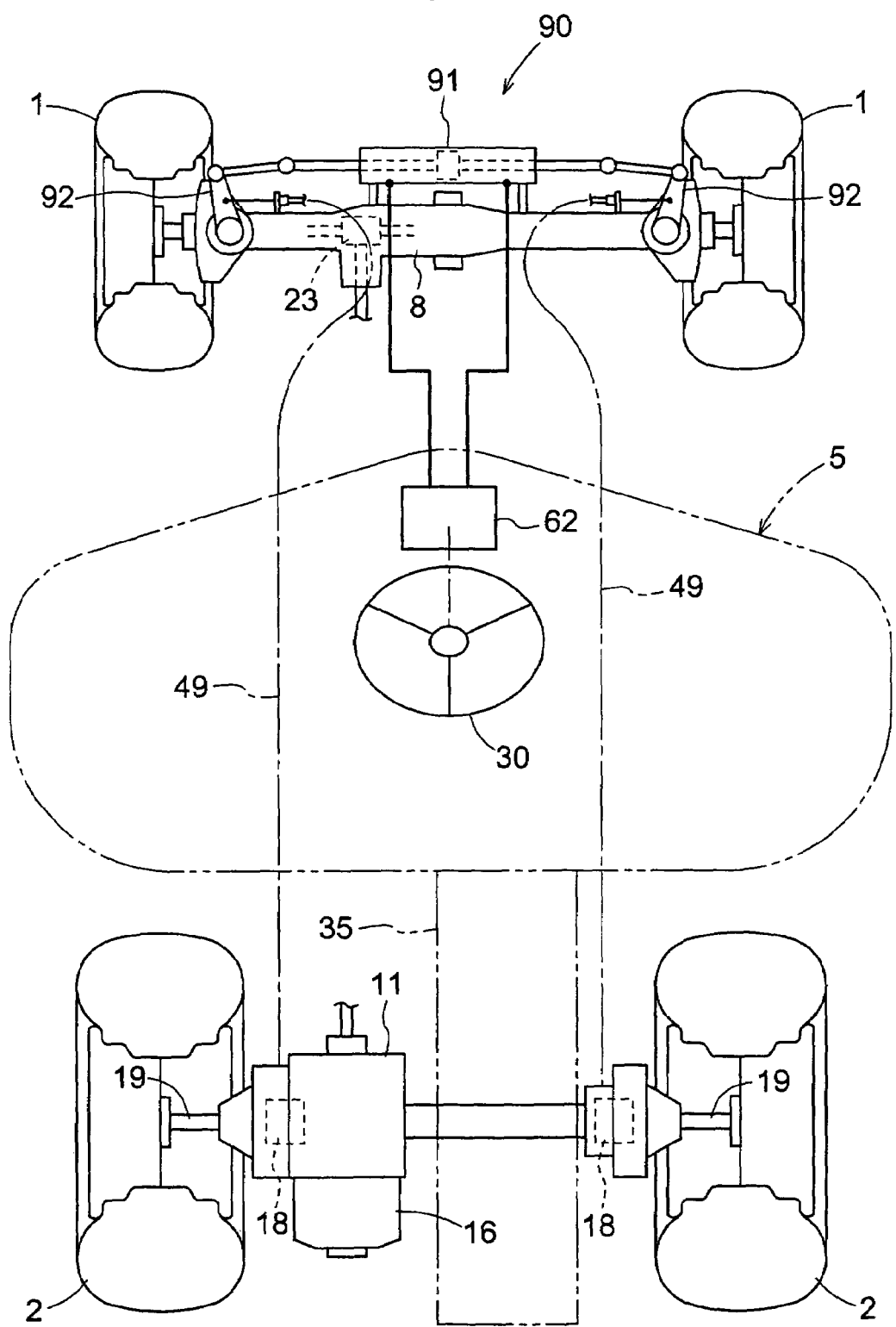
FIG. 12 is a plan view showing a vehicle traveling system under a straight traveling condition.
Figure 13:
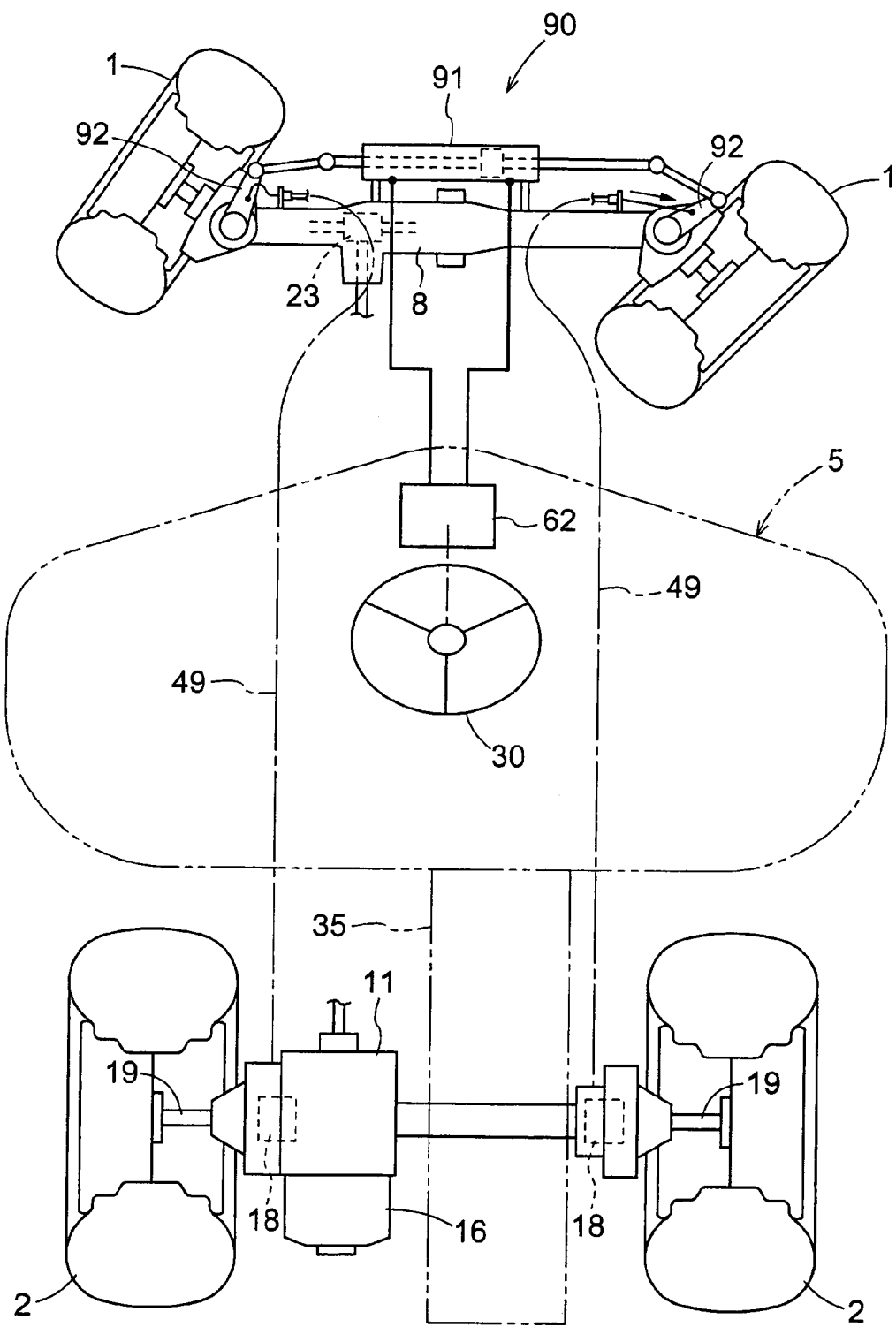
FIG. 13 is a plan view showing the vehicle traveling system under a right-turn condition.

As shown in FIG. 12, the release wires 49 for respectively operating the right and left side clutches 18 are operably connected to a steering mechanism 90 for the front wheels 1, so that these wires 49 can be automatically operated in association with a steering operation of the front wheels 1. More particularly, the steering mechanism 90 for the front wheels 1 is configured as a full-hydraulic power steering mechanism adapted for steering the right and left front wheels 1 by means of a double rod steering cylinder 91 mounted across and along the front axle case. The front end of the release wire 49 for operating the left side clutch 18 is connected to a left knuckle arm 92 and the front end of the other release wire 49 for operating the right side clutch 18 is connected to a right knuckle arm 92, respectively. In operation, during a straight traveling operation or a gentle turning operation, a pivotal displacement of the operational arm 48 is absorbed by the cam surface S, so that the right and left side clutches 18 are maintained under the engaged condition respectively, thus together providing a four-wheel drive. Whereas, as shown in FIG. 13, if the front wheels 1 are steered from the straight traveling condition by an angle greater than a set angle (e.g. 20°) by significantly turning a steering wheel 30 to the right, in association with this steering operation, only the side clutch 18 for the right rear wheel 2 located on the inner side of the turn being made will be disengaged automatically, thereby to provide a three-wheel drive with the right and left front wheels 1 and the left rear wheel 2 located on the outer side of the turn. Hence, as the right rear wheel 2 located on the inner side of the turn is rendered freely rotatable, the vehicle can make such a small turn without damaging the lawn.

Figure 8:
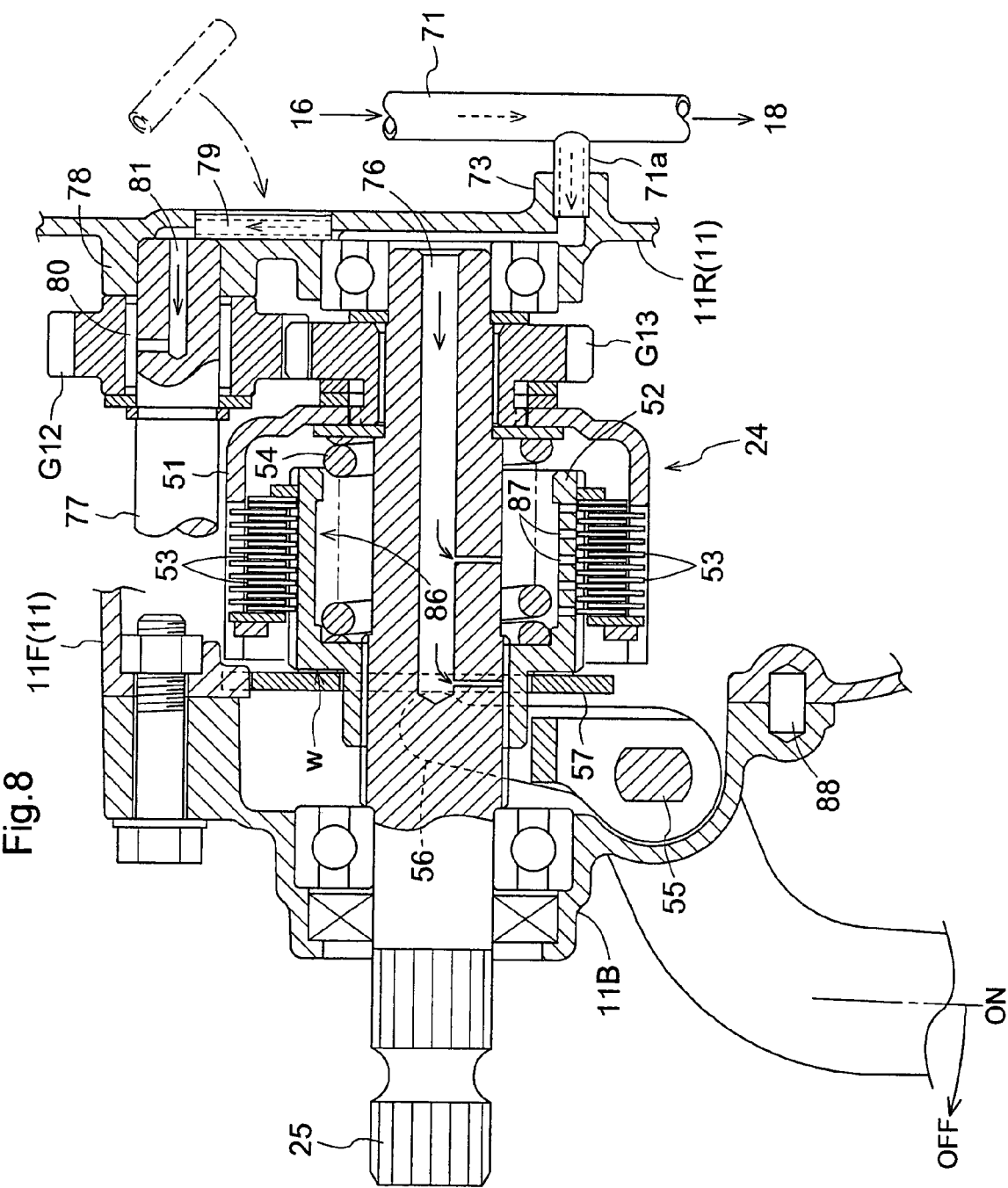
FIG. 8 is a side view in vertical section of a PTO clutch.

As shown in FIG. 8, the PTO clutch 24 is configured as a hydraulic multiple disc clutch, in which the gear G13 for receiving the power from the input shaft 15 of the transmission case 11 is loosely mounted on the PTO shaft 25 and a plurality of clutch discs 53 are alternately stacked between a clutch drum 51 engaged with a boss portion of the gear G13 and a clutch boss 52 shiftably splined on the PTO shaft 25.

The clutch box 52 incorporates therein a spring 54 for urging this clutch boss 52 to slide it to the left in the figure, thereby to contact and press the plurality of clutch discs 53. Normally, the PTO clutch 24 is maintained under a clutch engaged condition. Whereas, when the clutch boss 42 is slidably retracted to the right in the figure against the urging force of the spring 54, the mutually contacted pressed condition of the clutch discs 53 is released, thereby to realize a clutch disengaged condition.

Figure 9:
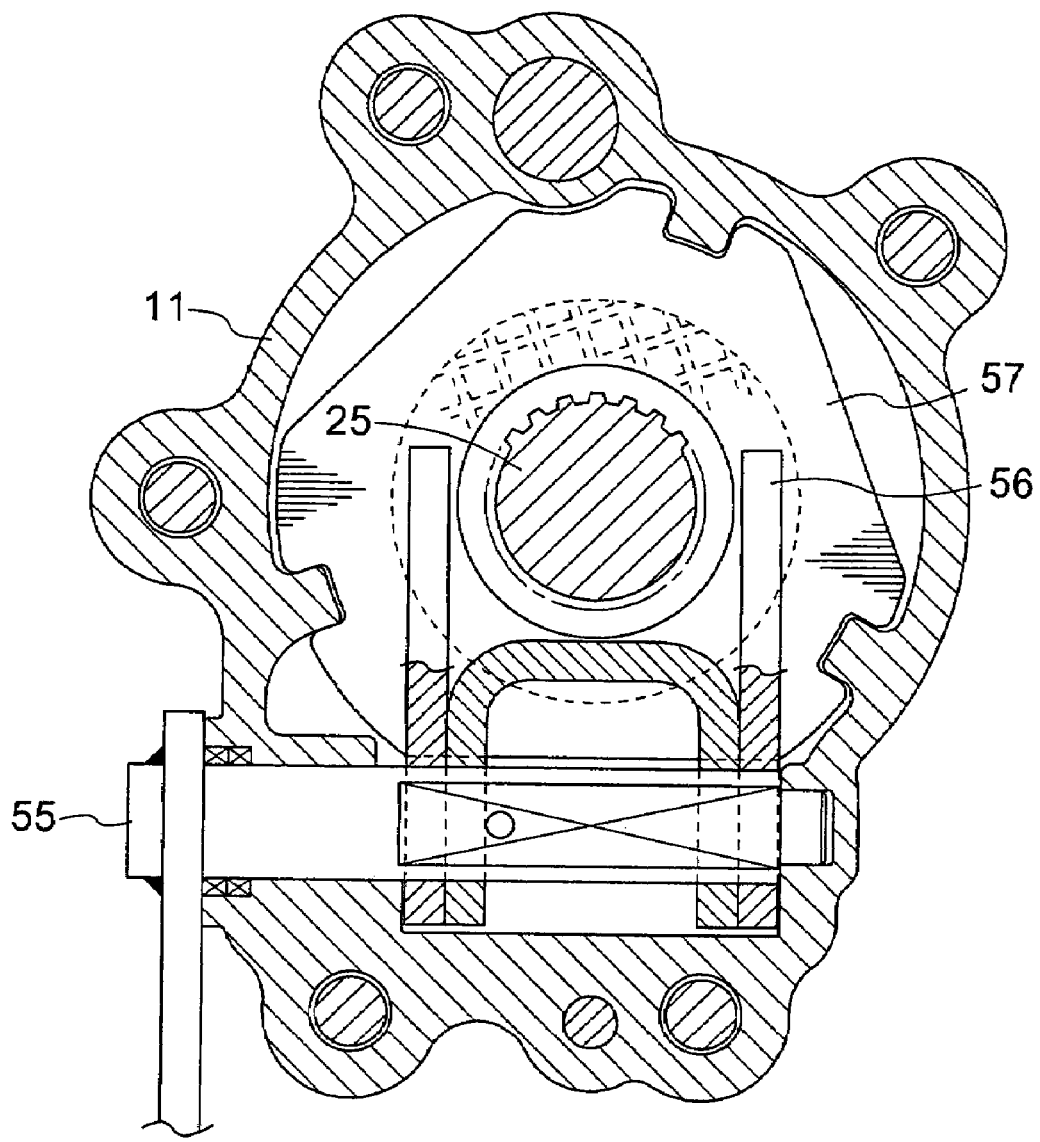
FIG. 9 is a front view of a braking means attached to the PTO clutch.
Figure 10:
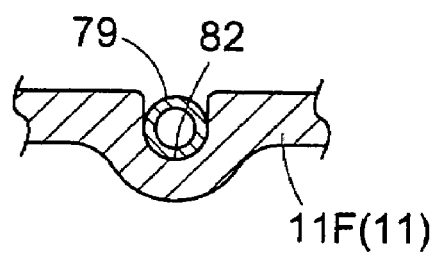
FIG. 10 is a section view showing an assembled condition of a lubricant supply tube.

Further, the transmission case 11 accommodates, within a front portion thereof, an operational fork 56 which is pivotally operated via a laterally oriented operational shaft 55 and a press plate 57 adapted to be pressed rearward by this operational fork 56 is loosely mounted on the clutch boss 52. This press plate 57 is received and supported at its rear side by a receiving face (w) formed like a step in the outer periphery of the clutch boss 52. In operation, the rearward operational force of the operational fork 56 is transmitted via the press plate 57 and the receiving face (w) to the clutch boss 52, so that this clutch boss 52 is pressed and displaced rearward (i.e. clutch disengaging direction) against the urging force of the spring 54. In this, as shown in FIG. 9, as appropriate outer peripheral portions of the press plate 57 are engaged with an inner face of the transmission case 11, the press plate 57 is rendered displaceable along the direction of clutch axis, but non-rotatable about the clutch axis.

As described hereinbefore, the PTO clutch 24 having the above-described construction is normally urged and maintained to the clutch engaged condition by the spring 54. When an operational lever 58 connected to the outer end of the operational shaft 55 is operated to pivot the operational fork 56, the clutch boss 52 is retracted via the press plate 57 against the urging force of the spring 54, so that the PTO clutch 24 is switched into the clutch disengaged condition. As a result, the power transmission from the clutch drum 51 to the clutch boss 52 is blocked and at the same time a rotational frictional resistance is applied to the clutch boss 52 pressed and contacted by the non-rotatable press plate 57 via the receiving face (w), thus applying a braking force to the PTO shaft 25 being rotated. This arrangement advantageously restricts unnecessary inertial rotation of the mower 5 to which the power transmission has already been blocked.

Figure 14:
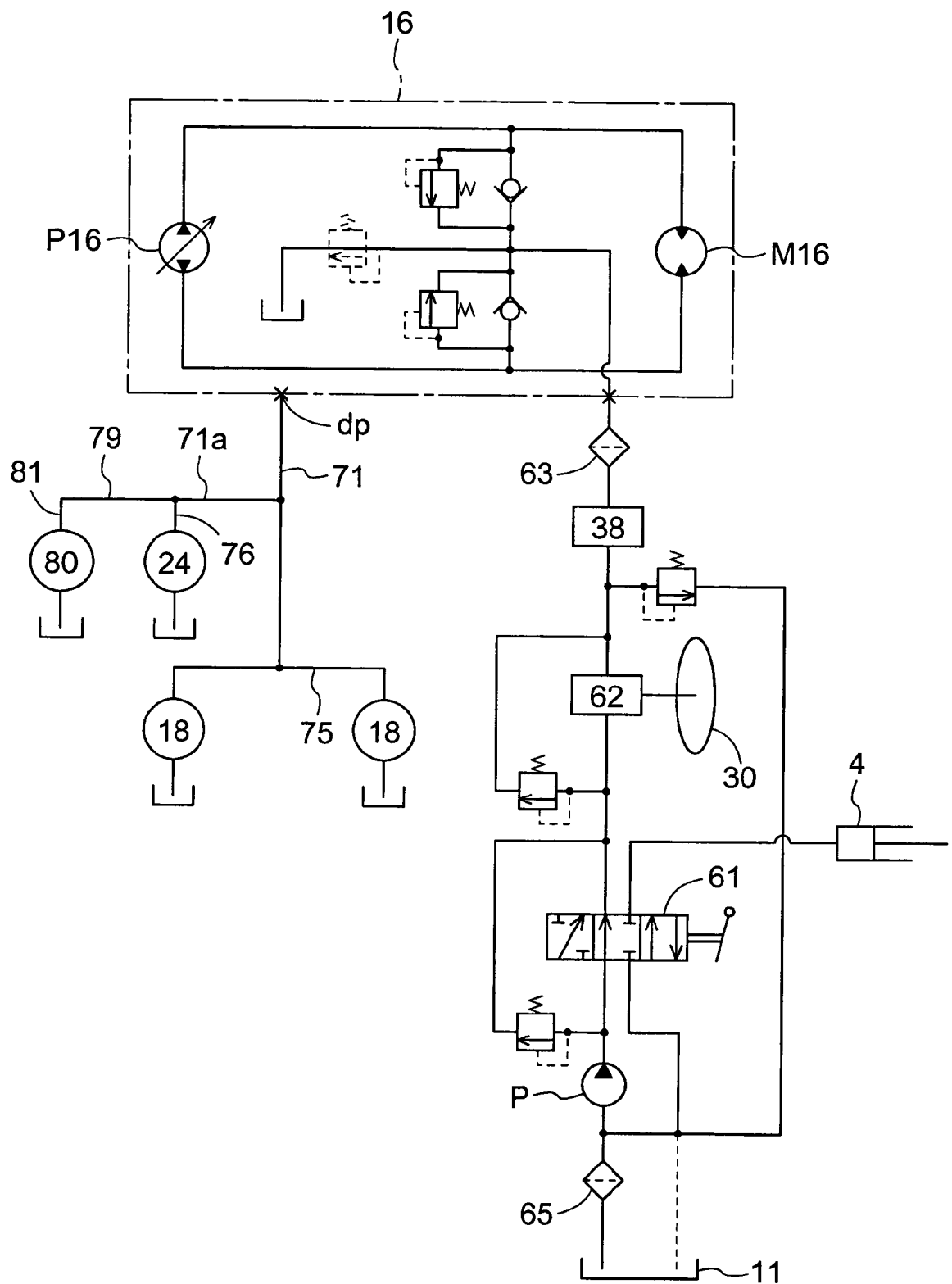
FIG. 14 is a hydraulic circuit diagram.

FIG. 14 shows a diagram of the hydraulic circuit provided in this lawn mower. In the figure, mark P denotes a charge pump for the HST, numeral 61 denotes a rotary control valve for operating and controlling the hydraulic cylinder 4 for moving the mower unit up and down, numeral 62 denotes a power steering controller pipe-connected to the steering cylinder 91, and numeral 63 denotes a cartridge type oil filter. The lubricant oil reserved in the transmission case 11 is utilized as an operating oil for this hydraulic circuit. Incidentally, this operating oil of the hydraulic circuit is sent via a pipe path comprising an iron pipe to the front portion of the vehicle body to be sent eventually to an oil cooler 38 disposed in opposition to an air passage of an engine cooling radiator 37. While the oil flows through the pipe path and an oil cooler 38, the oil is cooled by discharging heat therefrom and then this cooled oil is returned to the rear portion of the vehicle body.

As shown in FIG. 4, the charge pump P is mounted to the front face of the upper end of the transmission case 11, so that this pump P is driven by a pump driving shaft 64 acting as a second output shaft operably connected to the input shaft 15 via the gear G14 and the gear G15. In operation, the pump draws, via a pipe 66, the oil taken from the lower end of the transmission case 11 through a strainer 65 and pressure-feeds this discharged oil via a pressure-oil feed pipe 67. The pressure oil from the charge pump P is fed to the control valve 61, the power steering controller 62 and the oil filter 63 and then to the charge oil path of the HST 16, and excess oil and oil drained from the respective components are returned to the transmission case 11 acting also as an oil tank.

A valve block 68 incorporating the control valve 61 and so on is disposed upwardly of the transmission case 11. And, this valve block 68 includes a pump port which is connected via the pressure oil feed pipe 67 to the charge pump P, a cylinder port which is pipe-connected to the hydraulic cylinder 4 and an output port which is pipe-connected to the power steering controller 62. Further, the oil filter 63 is detachably attached to the rear face of this valve block 68.

The drain oil from the HST 16 is discharged from the front face of the port block 16d. This drain oil is supplied as the lubricant oil to portions requiring lubrication in the manner to be described next.

That is, as shown in FIG. 7, to a drain port (dp) formed in the front face of the port block 16d, an upper end of a guide pipe 71 is inserted and connected. And, a lower end of this guide pipe 71 is inserted and connected to a boss portion 72 for supporting the laterally longitudinal transmission shaft 17 formed integrally with a lower portion of the rear case section 11R constituting the transmission case 11. Further, an intermediate pipe 71a branched from an intermediate portion of the guide pipe 71 is inserted and connected to a boss portion 73 provided in an upper portion of the rear case section 11R.

As shown in FIG. 6, the lubricant oil fed from the lower end of the guide pipe 71 to the boss portion 72 is fed through an annular groove 74 formed inside the shaft bearing boss and an inner oil passage 75 formed inside the laterally oriented transmission shaft 17 to the inside of the respective clutch bosses 41 of the right and left side clutches 18, so that a sufficient amount of lubricant oil may be supplied to the gaps between the adjacent clutch discs 43 when the respective side clutch is disengaged. In this way, clutch disengaging performance is improved and also local excessive heating of the frictional transmitting portions is avoided.

Further, as shown in FIG. 8, the lubricant oil fed from the intermediate pipe 71a of the guide pipe 71 to the upper boss portion 73 is fed via an inner oil passage 76 formed inside the PTO shaft 25 to the inside of the PTO clutch 24 and the frictional portion between the press plate 57 and the clutch boss 52. Hence, a sufficient amount of lubricant oil is supplied to the gap between the adjacent clutch discs 43 when the clutch is disengaged. And, a sufficient amount of lubricant oil is supplied also to the frictional portion between the press plate 57 and the clutch boss 52. In this way, clutch disengaging performance is improved and also local excessive heating of the frictional transmitting portions is avoided. Incidentally, the inner peripheral face of the clutch boss 52 includes an oil retaining recess 86 extending along the shaft bearing direction and having a relatively large width. Further, a plurality of oil holes 87 are formed for supplying the lubricant oil retained in this recess 86 to the spline portion formed in the outer periphery of the clutch boss 41, thereby to ensure reliable feeding of the lubricant oil to the gasp between the clutch discs 43.

Further, a portion of the lubricant oil fed to the upper boss portion 73 is supplied, via a tube 79 formed of Nylon, to a boss portion 78 rotatably supporting a support shaft 77 of the gear G12, so that this oil may be supplied via an inner oil passage 81 formed inside the support shaft 77 to a needle bearing 80 rotatably supporting the gear G12. Incidentally, as shown in FIG. 9, the tube 79 is fitted and supported in a groove 82 formed in the connecting face of the front case section 11F. Also, the support shaft 77 of the gear G12 functions as a positioning knock pin for use in connection and assembly of the transmission case 11 comprising the front and rear separated construction and the case 11B bearing the PTO shaft 25. With this arrangement, the number of knock pins required is reduced advantageously. Incidentally, the shaft bearing case 11B is fixed in position by the support shaft 77 acting as the knock pin and a further knock pin 88 dedicated to this purpose.

Charging and replenishing of the lubricant oil to the transmission case 11 having the above-described construction are effected by drawing out the oil check gauge 36. In this connection, rubber hoses 85 are attached to and across adaptors 83, 84 mounted to the upper ends of the right and left reduction case portions 11b, 11d and the upper end of the main case portion 11a, so that any air entrapped inside the upper portions of the right and left reduction case portions 11b, 11d during the lubricant oil charging operation may be drained via the rubber hoses 85 to the upper end of the main case portion 11a.

The invention claimed is:

1. A lawn mower having driving front wheels and driving rear wheels, comprising:
    a mower unit mounted between the front wheels and the rear wheels to be vertically movable;
    an engine mounted to a front portion of a vehicle body;
    a transmission case disposed rearwardly of the engine;
    an HST coupled to a rear wall of the transmission case, the HST having a pump shaft and a motor shaft both projecting forwardly;

a charge pump for the HST attached to a front wall of the transmission case;

a transmission mechanism disposed inside the transmission case, the transmission mechanism including, an input shaft operably coupling a transmission shaft from the engine to the pump shaft, a first output shaft for transmitting power from the motor shaft to a transmission shaft for the front wheels, a PTO shaft for transmitting power from the input shaft to a transmission shaft for the mower unit, and a second output shaft for transmitting power from the input shaft to the charge pump;

wherein the first and second output shafts extend in a fore-and-aft direction of the mower and parallel with the input shaft, the second output shaft being disposed upwardly of the input shaft, the first output shaft being disposed downwardly of the input shaft.

2. The lawn mower according to claim 1, wherein a third output shaft for transmitting power from the motor shaft to a transmission shaft for the rear wheels extends in the fore-and-aft direction and parallel with the first and second output shafts, the third output shaft being disposed downwardly of the input shaft.

3. The lawn mower according to claim 1, wherein said rear wall of the transmission case is constructed as a port block for the HST.

4. The lawn mower according to claim 3, wherein a space is formed between a partitioning wall of the transmission case and said port block, said space being used as an oil level detecting portion.

5. The lawn mower according to claim 1, wherein a traveling brake acting on the motor shaft is mounted to a rear portion of the HST.

6. The lawn mower according to claim 5, wherein a cooling fan is mounted also to the rear portion of the HST, the cooling fan being driven by the pump shaft for cooling both the HST and the traveling brake.

* * * * *